Oct. 10, 1939.    O. E. TROYER    2,175,496
ROAD TESTING MACHINE
Filed June 29, 1937    2 Sheets-Sheet 1
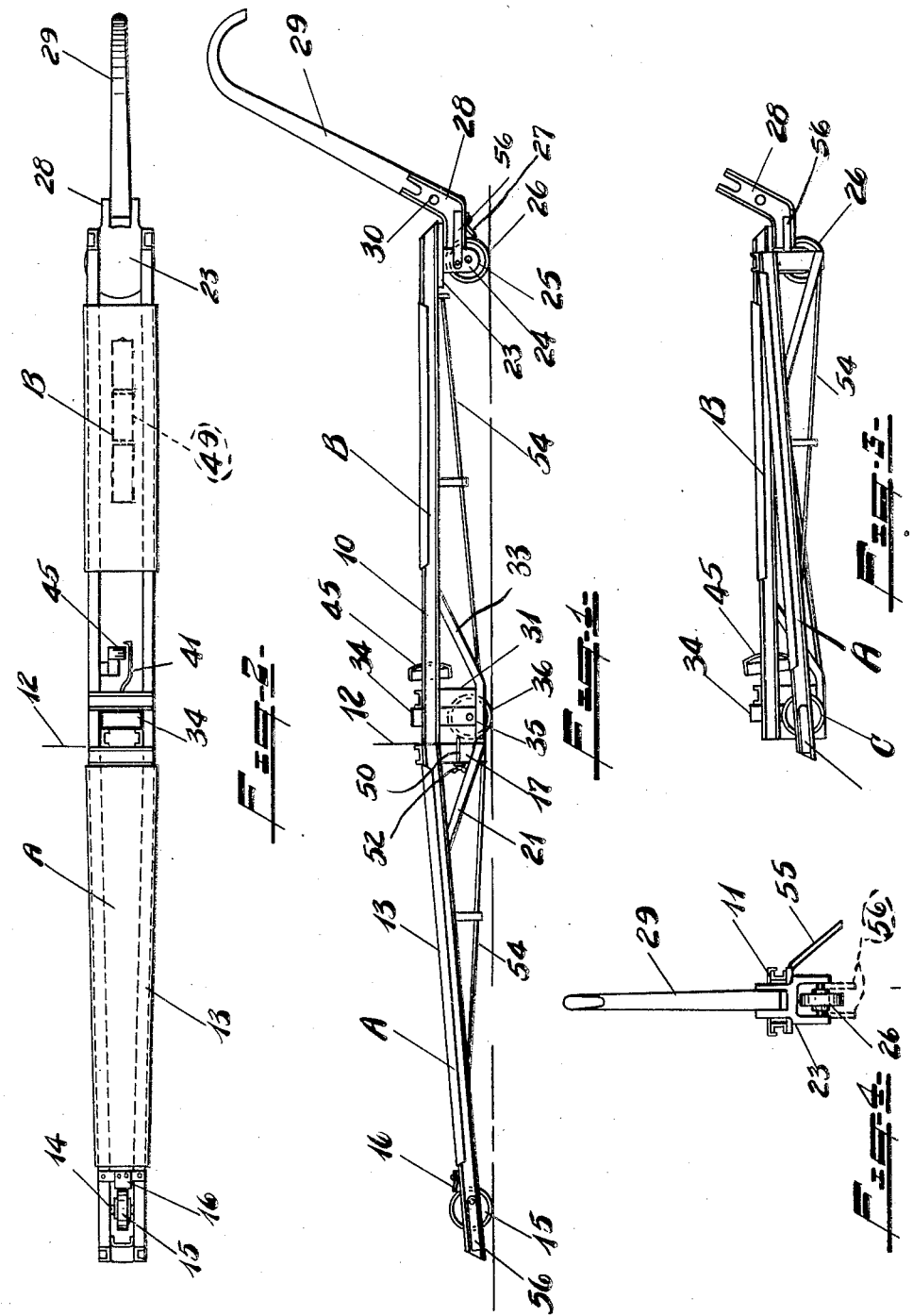
INVENTOR.
Ora E. Troyer.
BY Frank C. Fearman.
ATTORNEY.

Oct. 10, 1939.  O. E. TROYER  2,175,496
ROAD TESTING MACHINE
Filed June 29, 1937  2 Sheets-Sheet 2
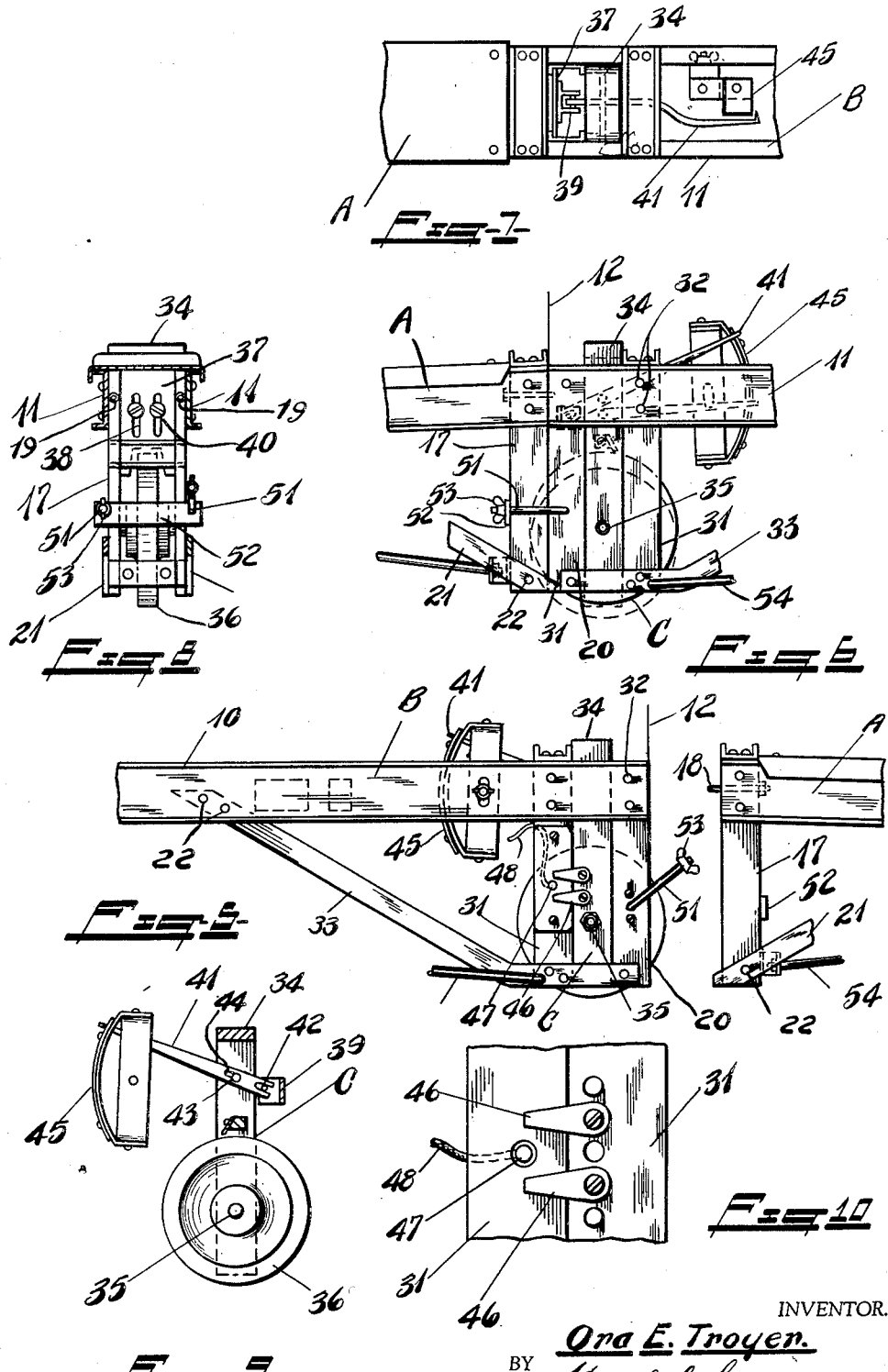
INVENTOR.
Ora E. Troyer.
BY Frank C Karman.
ATTORNEY.

Patented Oct. 10, 1939

2,175,496

UNITED STATES PATENT OFFICE 2,175,496

ROAD TESTING MACHINE

Ora E. Troyer, Fairview, Mich.

Application June 29, 1937, Serial No. 150,992

3 Claims. (Cl. 33—172)

This invention relates to testing machines and more particularly to a machine for testing the surface of roadways to determine whether they are level and true.

One of the prime objects of the invention is to design a foldable machine which can be compactly folded, so that it can be easily transported from one location to another, or stored in a limited space when not in use.

Another object is to provide a testing machine which can be easily and quickly set for the desired limits, which when the irregularity exceeds the limits set automatically sounds an alarm, and which also affords a visible indication of the irregularities, both within and beyond the limits or tolerances allowed the contractor or roadbuilder.

A further object is to provide a testing machine which can be utilized for checking forms to determine whether they are level and true, as well as indicating to the operator the variations from exact longitudinal alignment in the said forms.

A still further object is to provide a very simple, and practical, collapsible machine, which is easy to manufacture and assemble, which is rigid and accurate when set up, and which is light in weight so that it can be readily transported and handled.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction without departing from the spirit, or sacrificing any of the advantages of the invention.

In the drawings;

Fig. 1 is a side elevational view of my road testing machine.

Fig. 2 is a top plan view thereof.

Fig. 3 is a view showing the machine folded for transportation.

Fig. 4 is an end view showing the supporting leg swung down to support the machine when not in use, the broken lines indicating the form engaging legs swung down to engage the side of a form.

Fig. 5 is an enlarged fragmentary side elevational view, the abutting frame sections being shown disconnected.

Fig. 6 is a similar view of the opposite side of the machine with the sections coupled together, the broken lines showing the wheel lowered.

Fig. 7 is a top plan view thereof.

Fig. 8 is an end view.

Fig. 9 is a part sectional detail showing the indicator and dial arrangement.

Fig. 10 is an enlarged fragmentary detail of the alarm levers and contact.

In the construction of hard surface roadways, it is customary to permit a small degree of variation from exact longitudinal alignment in the surface of the roadway, and the inspection and testing of said roadway requires accurate mechanism and core to determine if the specification has been observed, and I have therefore, perfected a very simple, substantial and practical machine by means of which this testing may be accurately accomplished.

Referring now more specifically to the drawings in which I have shown the preferred embodiment of my invention, the machine consists of a frame 10, preferably formed of horizontally spaced apart channel members 11, divided on the line 12 to form individual frame sections A and B respectively, so that the machine may be folded for transportation or for storage in a limited space when not in use.

A plate 13 is riveted or otherwise secured to the channels of the section A to reinforce the structure, and an axle 14 is mounted on the frame at a point adjacent the front end thereof, and carries a road engaging wheel 15 which supports the front end of the frame in the usual manner, a scraper 16 being provided as shown to prevent dirt, small stones or other foreign matter adhering to the rim of the wheel.

Vertically disposed channels 17 are secured to the opposite end of the frame section A, and pins or pilots 18 are provided in said channels and register with suitable openings 19 provided in the channels 20 which form a part of the rear frame section B, angularly disposed bar braces 21 are provided on this section A as shown, and are securely bolted to the frame and to the lower ends of the channels 17 by means of bolts 22 for further reinforcing the structure, the lower ends of the braces projecting beyond the edges of the channels 17 and engage the side walls of the channels 20 to properly align the sections.

The rear frame section is substantially the same as the front section, a bracket 23 being secured to the lower face of the channel members 11 at the rear end and is formed with legs 24 in which an axle 25 is mounted, a road engaging wheel 26 being journaled on the axle in the usual manner, and a scraper 27 is also provided to keep the wheel rim free from dirt, said bracket including a rearwardly and upwardly extending portion 28 to which a handle 29 is attachably secured by means of bolts 30.

Identically similar channel members 31 are spaced from the channels 20 and are secured to the frame by means of bolts 32 or the like, the lower ends being braced by means of the bar braces 21, similar to those on the front section, the side walls of the channels 20 and 31 forming a guide for the wheel unit C which is mounted for limited vertical travel therein. This wheel unit comprises an inverted, U-shaped bracket 34, in which an axle 35 is mounted as usual, a road engaging wheel 36 being journaled thereon, said wheel unit being slidable vertically to conform to the variations or irregularities in the surface of the road or pavement as it travels thereover.

The vertical movement of this wheel unit C is designed to actuate the indicator which affords a visible indication of irregularities in the surface of the roadway, and comprises a transversely disposed plate 37 secured to the channels 20, and provided with slotted openings 38 in the face thereof, a bracket 39 being adjustably secured on said plate by means of bolts 40, and one end of an indicator 41 is pivotally secured to this bracket by means of the pin 42, a transversely disposed pin 43 being mounted in the bracket 34 and extends through a slotted opening 44 provided in the indicator, the free end of said indicator being turned and travels over the graduated face of the member 45 which is adjustably mounted on the frame, this face being clearly visible to the operator so that the extent of the variations in the surface of the roadway can be readily seen by the operator.

In addition to providing a visible indication of the irregularities in the surface of the roadway I also provide a buzzer or alarm which is actuated when the irregularities are greater or less than the permissible variation from a straight line of the surface, this alarm comprising vertically spaced arms 46 adjustably mounted and spaced on the bracket 34 of the wheel unit, and an insulated contact 47 is provided on the channel 31, suitable connections 48 leading to conventional dry batteries 49 provided on the frame, the buzzer being sounded when the wheel assembly raises or lowers to bring one of the contact arms in engagement with the contact.

It is, of course, important that the frame sections A and B be connected in a manner to form a rigid frame unit, inasmuch as this frame must be at least ten feet in length and must be supported at the ends with the center or intermediate wheel serving as the gauge, and I therefore, provide bolts 50 which are pivotally anchored in the channels 20 as shown, said bolts engaging slotted openings 51 provided in the transversely disposed bar 52 which is in turn bolted to the channels 17, wing nuts 53 being provided on said bolts, so that the sections may be rigidly secured together, the pins and braces 18 and 21 respectively serving as pilots and guides to properly align the sections when the machine is assembled. Brace rods 54 are provided as shown and serve to further reinforce the frame.

A leg 55 is pivotally connected to the side of the frame as shown and serves as a standard to support the machine in upright position when not in use, said leg being swung against the side of the frame when the machine is in operation.

In testing a pavement or roadway the machine is normally pushed over the surface of the road, and as the wheels 15 and 26 are spaced a considerable distance apart, the intermediate wheel 36 will move vertically as it travels over high or low spots, and the extent of the irregularities will be accurately indicated by the dial. Certain tolerances are, of course, set up for the contractor, but if these tolerances are exceeded the alarm will be sounded to indicate that it is exceeded, and the indicator will indicate the extent.

The machine can also be utilized for checking forms to determine if the upper surface is level and true, legs 56 (see Fig. 4) being pivotally secured to the sides of the machine and engage the side wall of the form, (not shown) these legs serving as a guide so that the machine may be operated on the top of the form which is ofttimes quite narrow.

When not in use the wing nuts 53 are unscrewed to permit the bolts 50 to be disengaged from the bar 52 and the sections A and B can then be placed side by side in a very limited space.

From the foregoing description it will be clearly obvious that I have perfected a very simple, practical, economical and accurate testing machine for testing the irregularities to the surface of a roadway.

What I claim is:

1. In a road testing machine, the combination of a pair of longitudinally aligned frame sections secured together in end to end relation, pilots on one of the said sections and engageable with the opposite section, downwardly depending legs on the end of each section, a transversely disposed bar on the legs of one of said sections, pivotally mounted bolts on the legs of the opposite section and detachably engageable with said bar for rigidly securing the sections together, a wheel on one end of each frame section, an intermediate wheel assembly mounted for vertical movement in the frame, an indicator adjustably and pivotally mounted on the frame and actuated by the vertical movement of the wheel assembly in the frame, a graduated dial adjustably mounted on the frame and co-operating with the indicator, and foldable guide legs secured to and depending from the side wall of said frame sections for engaging the walls of a form.

2. In a road testing machine, the combination with two longitudinally aligned frame sections adapted to be detachably secured together in interlocking relation, each section being provided at its connecting end with downwardly depending members, a transversely disposed bar on one of said members, bolts pivotally mounted on the opposite member, and engaging said bar for rigidly and releasably securing the sections in assembled relation, a wheel provided on the free end of each section, a gauge wheel unit freely slidable in a vertical direction on said frame, a graduated dial on the frame, and an indicator associated with said slidable wheel unit for indicating the variations in the surface over which the machine is traveling.

3. In a road testing machine, the combination with two longitudinally disposed, relatively light frame sections adapted to be detachably secured together in interlocking relation, and connecting ends of each section being provided with aligning means and downwardly projecting legs disposed in facial contact, means for rigidly and releasably securing said legs together, said means including pivoted bolt members mounted on the legs of one of said sections and engageable with the legs of the outer section, means for bracing said legs, a second downwardly projecting leg spaced from the end leg on one of said sections, said legs forming a guide, a vertically movable intermediate wheel assembly freely slidable in a vertical direction in said guide, a wheel on the outer free end of each section, a graduated dial on the frame adjacent said slidable unit, and an indicator mounted on said unit with one end engageable with the frame for swinging the opposite end of the indicator over the face of the dial when the machine travels over uneven surfaces in a roadway.

ORA E. TROYER.